United States Patent
Chen

(10) Patent No.: US 9,177,522 B2
(45) Date of Patent: Nov. 3, 2015

(54) DISPLAY METHOD AND STEREOSCOPIC DISPLAY SYSTEM THEREOF

(71) Applicant: AU Optronics Corp., Hsin-Chu (TW)

(72) Inventor: Yu-Chu Chen, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/186,469

(22) Filed: Feb. 21, 2014

(65) Prior Publication Data

US 2014/0313173 A1 Oct. 23, 2014

(30) Foreign Application Priority Data

Apr. 18, 2013 (TW) .............................. 102113825 A

(51) Int. Cl.
*G09G 5/00* (2006.01)
(52) U.S. Cl.
CPC ........................................ *G09G 5/00* (2013.01)
(58) Field of Classification Search
CPC .................... G09G 5/00; H04N 13/00–13/007
USPC ...................................................... 348/42–60
See application file for complete search history.

(56) References Cited

U.S. PATENT DOCUMENTS

| 2004/0222945 A1 | 11/2004 | Taira et al. |
| 2007/0146234 A1 | 6/2007 | Taira et al. |
| 2008/0211736 A1 | 9/2008 | Taira et al. |

FOREIGN PATENT DOCUMENTS

| CN | 1525243 | 9/2004 |
| CN | 1525243 A | 9/2004 |
| CN | 102316337 A | 1/2012 |
| TW | 201027980 | 7/2010 |

OTHER PUBLICATIONS

Chen, "Tech Stepping Stones: Switchable 2D/3D", Apr. 2010.
Jar-Ferr Yang, "Disparity Modification and Blur Operation for Comfortable DIBR Systems", Aug. 8, 2012.
Patrick Chan, "The Inherent Problems of Motion Blur and Judder on HD LCD TVs ", Aug. 22, 2008.
Taiwan Patent Office, "Office Action", Oct. 27, 2014.
Taiwan Patent Office, "Office Action", Dec. 25, 2014.
China Patent Office, "Office Action", Dec. 25, 2014.

*Primary Examiner* — Michael Pervan
(74) *Attorney, Agent, or Firm* — WPAT, PC; Justin King

(57) ABSTRACT

A display method and a stereoscopic display system thereof are provided. The stereoscopic display system comprises an image display unit and an image switching unit. The image switching unit is configured on a display surface of the image display unit. The display method comprises the following steps of: driving the image display unit to display a dragging window; driving the image switching unit when the dragging window is executed on a 3D display mode, so that the dragging window can display a 3D image; determining whether the dragging window is moved; executing a 2D display mode and turning off the image switching unit when the dragging window is moved, so that the dragging window can display a 2D image.

12 Claims, 3 Drawing Sheets

DISPLAY METHOD AND STEREOSCOPIC
DISPLAY SYSTEM THEREOF

TECHNICAL FIELD

The present disclosure relates to a stereoscopic display technology, and more particularly to a display method and a stereoscopic display system using the display method.

BACKGROUND

With the progress of display technology, viewers are particular about visual enjoyment of images displayed on a display. In order to satisfy the viewers with visual enjoyment of images displayed on the display, relevant manufacturers developed stereoscopic image displays.

Current stereoscopic image display is mainly constituted of lenticular lens, a display panel and a control circuit, wherein the control circuit is used for driving the display panel and the lenticular lens, so that contents of a 2D image displayed on the display panel can be split by the lenticular lens and transmitted to the left eye and right eye of a viewer, so that the viewer can view a 3D image on the display. However, for a current stereoscopic image display, when the viewer moves the dragging window, since the lenticular lens and the display panel are driven by the control circuit with different driving speeds, an image separation occurs due to a moving speed of an area of the dragging window corresponding to the lenticular lens is slower than a moving speed of the dragging window. Thus, visual effects are not good, so that visual enjoyment of the viewer is affected.

SUMMARY

The disclosure provides a display method, being applied to a stereoscopic display system comprising an image display unit and an image switching unit, the image switching unit is configured on a display surface of the image display unit. The display method comprises: driving the image display unit to display a dragging window; driving the image switching unit when the dragging window is executed on a 3D display mode, so that the dragging window displays a 3D image; determining whether the dragging window is moved; and executing a 2D display mode and turning off the image switching unit when the dragging window is moved, so that the dragging window displays a 2D image.

The disclosure further provides a stereoscopic display system, comprising an image display unit, an image switching unit and a control module. The image display unit has a dragging window. The image switching unit is configured on a display surface of the image display unit. The control module is electrically connected to the image display unit and the image switching unit, the control module has a 3D display mode and a 2D display mode. The control module executes the 2D display mode when the dragging window is moved, so that the dragging window displays a 2D image, while the control module executes the 3D display mode when the dragging window is stopped, so that the dragging window displays a 3D image.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED
EMBODIMENTS

The disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
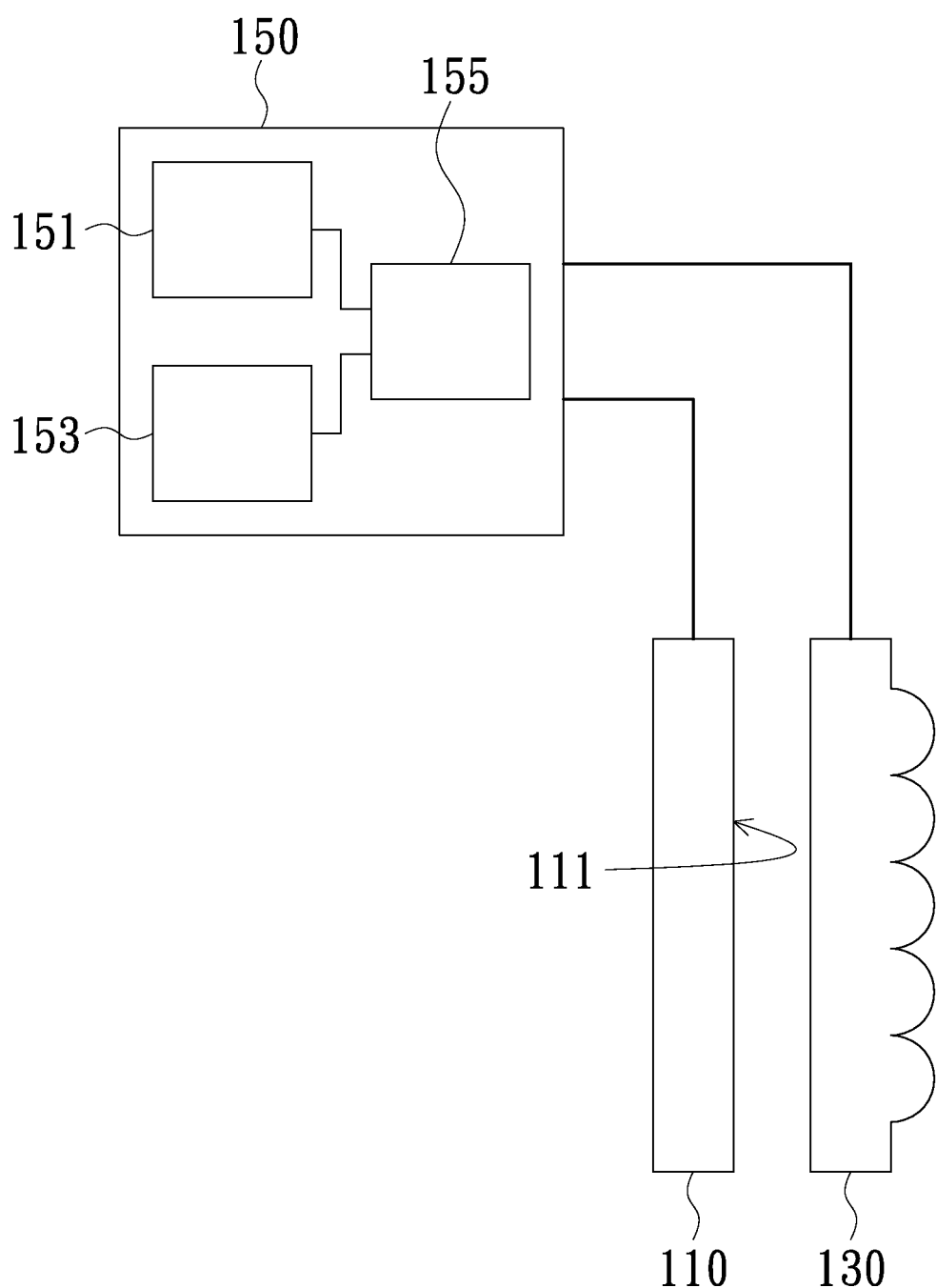
FIG. 1 is a schematic diagram showing a stereoscopic display system in accordance with one embodiment of the disclosure.

Please refer to FIG. 1, which is a schematic diagram showing a stereoscopic display system in accordance with one embodiment of the disclosure. The stereoscopic display system 10 comprises an image display unit 110, an image switching unit 130 and a control module 150. In this embodiment, the image display unit 110 is implemented by a planar display panel. The planar display panel can be a liquid crystal display panel, an organic light emitting diode display panel, a plasma display panel, an electrophoresis display panel or any other suitable display panel. Since the above-mentioned display panels are well-known to those skilled in the art, detailed description is omitted. The image switching unit 130 is configured on a display surface 111 of the image display unit 110. The image switching unit 130 can also be implemented by lenticular lens.

The control module 150 is electrically connected to the image display unit 110 and the image switching unit 130, so as to output an image display signal and an image switching signal, for driving the image display unit 110 and the image switching unit 130 at different modes, respectively, so that a viewer can view a 2D image or a 3D image. In addition, the control module 150 is used for driving the image display unit 110 to display a dragging window; an area of the dragging window is smaller than the area of the display surface 111 of the image display unit 110. In this embodiment, the control module 150 comprises a storage unit 151, a detection unit 153 and a processing unit 155. The storage unit 151 and the detection unit 153 are electrically connected to the processing unit 155. The processing unit 155 of the control module 150 determines whether a stopped time period during which the dragging window is continuously remained still to now is greater than a preset time period stored in the storage unit 151. The preset time period can be smaller than or equal to the human eye response time. When the processing unit 155 of the control module 150 determines that the stopped time period is greater than the preset time period, the processing unit 155 of the control module 150 executes the 3D display mode. The detection unit 153 of the control module 150 outputs a detection result according to a position coordinate of the dragging window, so that the processing unit 155 determines whether the dragging window is moved by the viewer according to the detection result.

Figure 2:
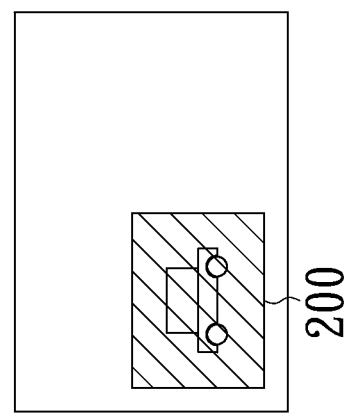
FIG. 2 is a schematic diagram showing a display screen of the stereoscopic display system shown in FIG. 1.
Figure 2:
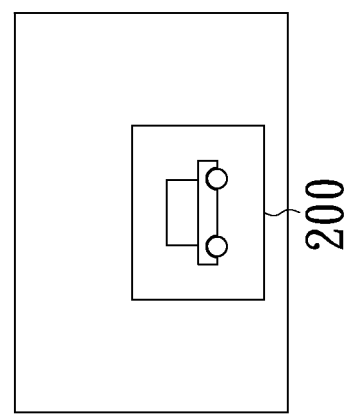
Figure 2:
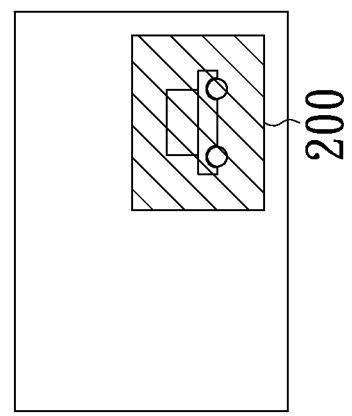

FIG. 2 is a schematic diagram showing a display screen of the stereoscopic display system 10. In FIG. 2, the reference numeral 200 is referred to the dragging window, while the dragging window 200 with slant lines is used to indicate a part which corresponds to the dragging window 200 being driven by the image switching unit 130 of the control module 150, so that a viewer can view a 3D image from the dragging window

200. Referring to FIGS. 1 and 2, the control module 150 has a 2D display mode and a 3D display mode. When the dragging window 200 is moved by the viewer or a controller, the control module 150 executes the 2D display mode, and stops driving the image switching unit 130, so that the viewer can view the 2D image from the dragging window 200. When the dragging window is stopped moving by the viewer or a controller, the control module 150 executes the 3D display mode, and drives the image switching unit 130, so that the viewer can view the 3D image from the dragging window 200.

In practical, when the processing unit 155 of the control module 150 executes the 3D display mode, the control module 150 drives the image display unit 110 to display the dragging window 200, to which two images (not shown) are provided, wherein one image is displayed as a 2D left-eye image, and the other image is displayed as a 2D right-eye image. Also, the control module 150 drives the image switching unit 130, so that the 2D left-eye image and the 2D right-eye image can be respectively transmitted to the left eye and right eye of the viewer by turning on the image switching unit 130 and thus changing propagation angles of light beams. By this way, the viewer can view the 3D image on the dragging window 200 (shown by slant lines). On the other hand, when the control module 150 executes the 2D display mode, the control module 150 stops driving the image switching unit 130, and scales one of the above-mentioned 2D left-eye image and 2D right-eye image to a size of the dragging window 200, so that the viewer can view the 2D image from the dragging window 200 during the period the dragging window 200 being moved.

Figure 3:
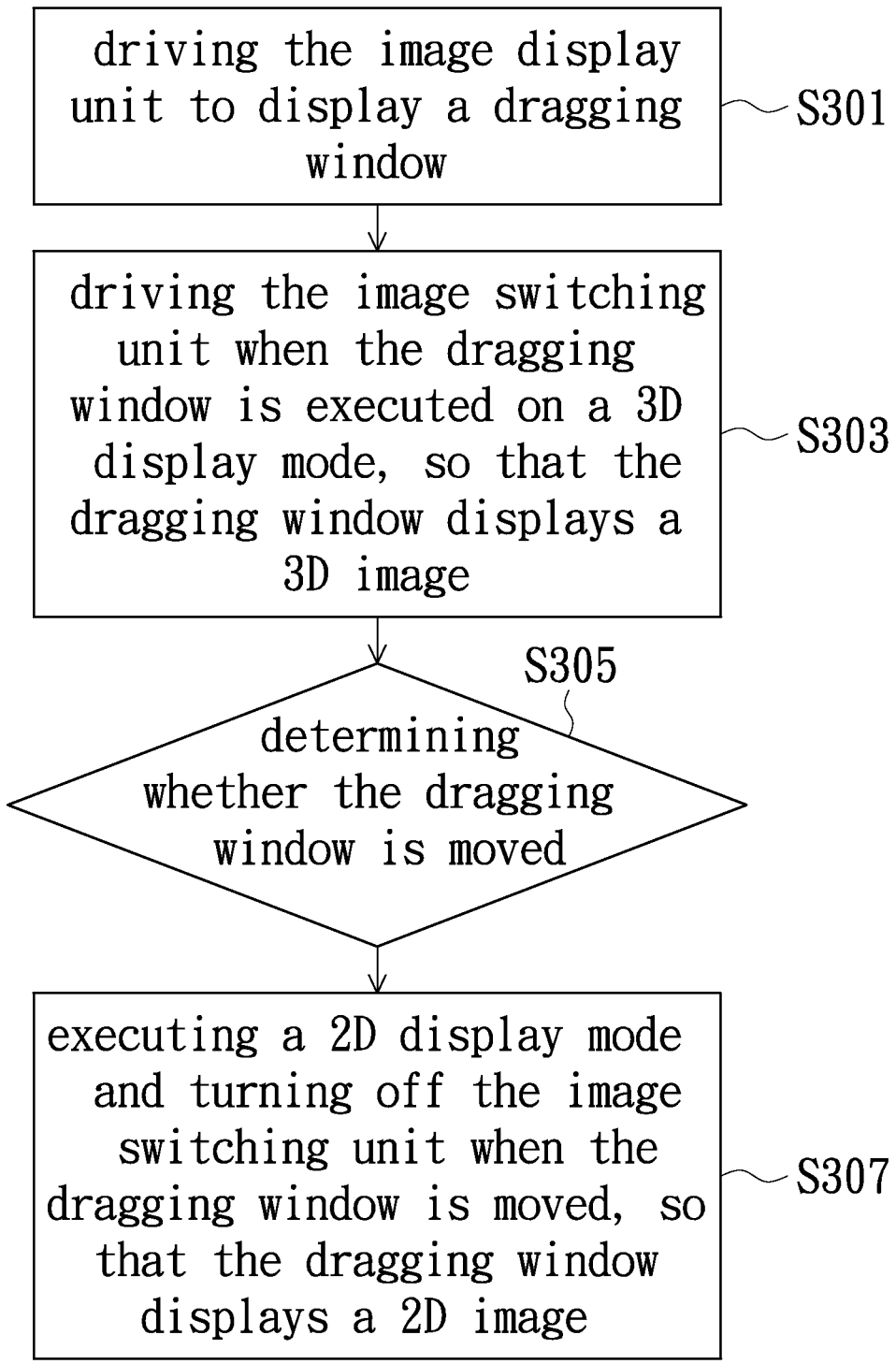
FIG. 3 is a flowchart showing a display method of the stereoscopic display system in accordance with one embodiment of the disclosure.

According to the description of the above embodiment, it can be summarized that the stereoscopic display system 10 of the disclosure executes several basic operation steps, as shown in FIG. 3. FIG. 3 is a flowchart showing a display method of the stereoscopic display system in accordance with one embodiment of the disclosure, wherein the stereoscopic display system comprises an image display unit and an image switching unit, the image switching unit is configured on a display surface of the image display unit. Please refer to FIG. 3, the display method comprises the following steps of: firstly, driving the image display unit to display a dragging window (as shown in step S301); driving the image switching unit when the dragging window is executed on a 3D display mode, so that the dragging window can display a 3D image (as shown in step S303); next, determining whether the dragging window is moved (as shown in step S305); and finally, executing a 2D display mode and turning off the image switching unit when dragging window is moved, so that the dragging window can display a 2D image (as shown in step S307).

In summary, the way that the disclosure solved the aforementioned problem is that the stereoscopic display system adopts the above-mentioned display method. The stereoscopic display system adopting the display method determines whether the dragging window is moved. When the stereoscopic display system determines that the dragging window is moved, the stereoscopic display system executes a 2D display mode, and turns off a part of the image switching unit corresponding to the dragging window, so that image separations do not occur on the dragging window being moved. Moreover, the stereoscopic display system scales a 2D left-eye image or 2D right-eye image to be a size of the dragging window when the dragging window is moved, so that the viewer can view a 2D image rather than two images including the 2D left-eye image and the 2D right-eye image from the dragging window. Therefore, the stereoscopic display system of the disclosure does not have the problem of bad visual effects when the dragging window is moved, and thus visual enjoyment of the viewer is greatly improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display method, being applied to a stereoscopic display system, the display method comprising:
    displaying a dragging window on the stereoscopic display system;
    detecting the dragging window being moved or not;
    executing on a 2D display mode only when the dragging window being moved, so as to the dragging window displays a 2D image; and
    executing on a 3D display mode only when the dragging window being stopped, so as to the dragging window displays a 3D image.

2. The display method according to claim 1, wherein detecting the dragging window being moved or not, further comprises:
    detecting a coordinate of the dragging window in a first moment;
    detecting a coordinate of the dragging window in a second moment, wherein the first moment and the second moment are independent; and
    determining the coordinate of the dragging window being the same or not.

3. The display method according to claim 1, wherein executing on a 2D display mode only when the dragging window being moved, so as to the dragging window displays a 2D image, comprises:
    scaling one of a 2D left-eye image and a 2D right-eye image of the 3D image displayed on the dragging window to be a size of the dragging window, so as to display the 2D image.

4. The display method according to claim 1, wherein executing on the 3D display mode when the dragging window being stopped, so as to the dragging window displays the 3D image, comprises:
    determining the dragging window being stopped for a predetermined time.

5. A display method, being applied to a stereoscopic display system, the display method comprising:
    displaying a dragging window on the stereoscopic display system;
    detecting a coordinate of the dragging window being change during a time period;
    executing on a 2D display mode only when the dragging window being moved, so as to the dragging window displays a 2D image; and
    executing on a 3D display mode only when the dragging window being stopped, so as to the dragging window displays a 3D image.

6. The display method according to claim 5, wherein detecting a coordinate of the dragging window being change during a time period, comprises:
    detecting the coordinate of the dragging window in a first moment;
    detecting the coordinate of the dragging window in a second moment, wherein the first moment and the second moment are independent; and determining the coordinate of the dragging window being the same or not.

7. The display method according to claim 5, wherein executing on a 2D display mode only when the dragging window being moved, so as to the dragging window displays a 2D image, comprises:
scaling one of a 2D left-eye image and a 2D right-eye image of the 3D image displayed on the dragging window to be a size of the dragging window, so as to display the 2D image.

8. The display method according to claim 5, wherein executing on a 3D display mode only when the dragging window being stopped, so as to the dragging window displays a 3D image, comprises:
determining the dragging window being stopped for a predetermined time.

9. A display method, being applied to a stereoscopic display system comprising an image display unit and an image switching unit, the image switching unit being configured on a display surface of the image display unit, the display method comprising:
driving the image display unit to display a dragging window;
driving the image switching unit when the dragging window is executed on a 3D display mode, so that the dragging window displays a 3D image;
determining whether the dragging window is moved;
executing a 2D display mode and turning off the image switching unit when the dragging window is moved, so that the dragging window displays a 2D image; and
executing the 3D display mode only when the dragging window being stopped, so as to the dragging window displays the 3D image.

10. The display method according to claim 9, wherein determining whether the dragging window is moved, comprises:
detecting a first coordinate of the dragging window in a first moment;
detecting a second coordinate of the dragging window in a second moment, wherein the first moment and the second moment are independent; and
determining the first coordinate and the second coordinate of the dragging window being the same or not.

11. The display method according to claim 9, wherein executing a 2D display mode and turning off the image switching unit when the dragging window is moved, so that the dragging window displays a 2D image, comprises:
scaling one of a 2D left-eye image and a 2D right-eye image of the 3D image displayed on the dragging window to be a size of the dragging window, so as to display the 2D image.

12. The display method according to claim 9, wherein executing the 3D display mode only when the dragging window being stopped, so as to the dragging window displays the 3D image, comprises:
determining the dragging window being stopped for a predetermined time.

\* \* \* \* \*